Aug. 1, 1933.  W. L. BRYANT  1,920,290
GRINDING MACHINE OR THE LIKE
Filed May 1, 1930  2 Sheets-Sheet 1
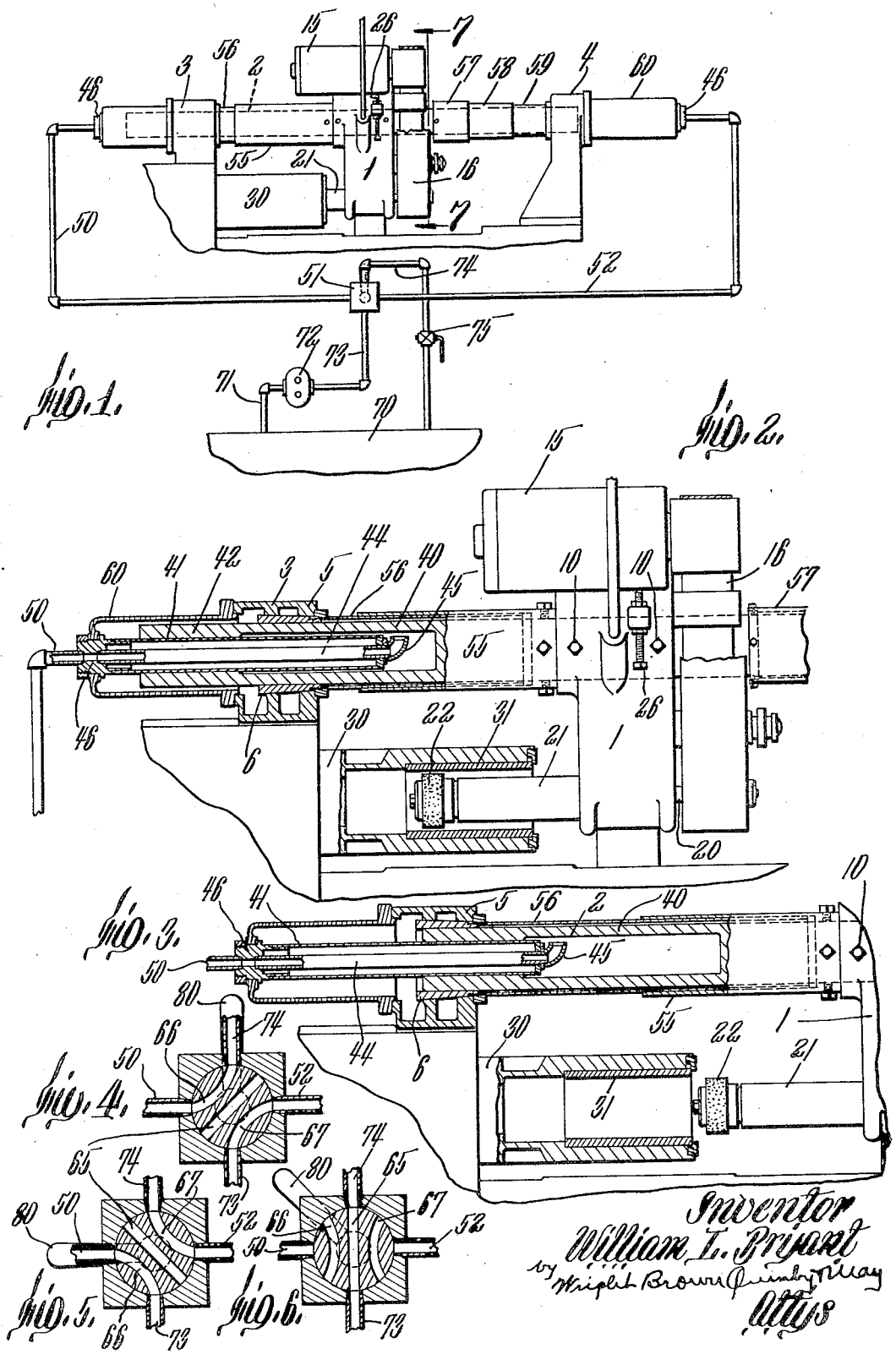

Aug. 1, 1933.  W. L. BRYANT  1,920,290
GRINDING MACHINE OR THE LIKE
Filed May 1, 1930  2 Sheets-Sheet 2
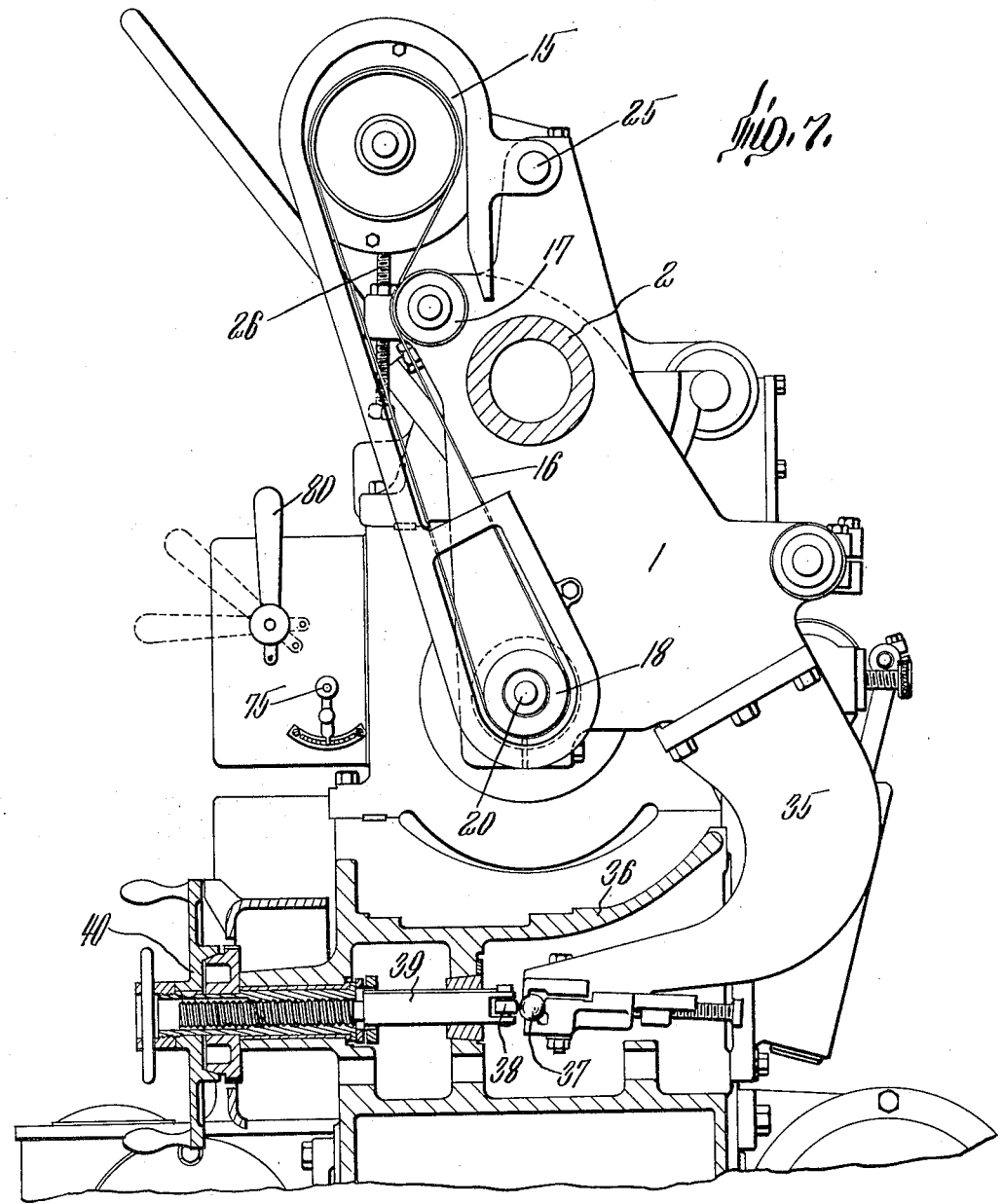
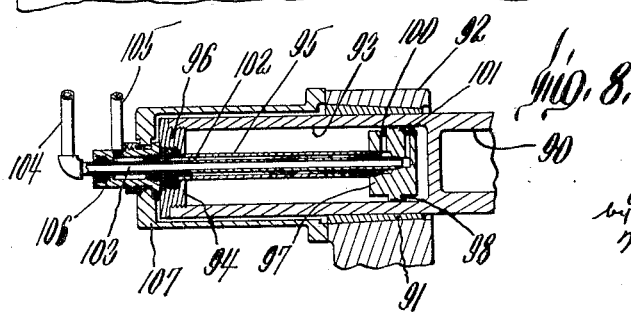
Inventor
William L. Bryant
by Wright Brown Quimby & May
Attys Patented Aug. 1, 1933

1,920,290

UNITED STATES PATENT OFFICE 1,920,290

GRINDING MACHINE OR THE LIKE

William L. Bryant, Springfield, Vt.; Blanche B. Bryant, administratrix of said William L. Bryant, deceased, assignor to Bryant Chucking Grinder Company, Springfield, Vt., a Corporation of Vermont Application May 1, 1930. Serial No. 448,939

6 Claims. (Cl. 51—50.)

This invention relates to machines of a type commonly employed for grinding where the cutting or grinding tool or the work is carried by an arm rockable about an axis parallel to the work axis to feed and retract the tool from the work, and movable lengthwise of this axis to traverse the work, and more especially where the pivot for the arm comprises a rockable and axially movable bar. It has for an object to provide a hydraulic mechanism for producing certain motions of the arm and more particularly its reciprocation and in which the bar comprises a part of the hydraulic mechanism.

For a more complete understanding of this invention, reference may be had to the accompanying drawings in which Figure 1 is a fragmentary somewhat diagrammatic front elevation of the machine when the tool is carried by the pivoted arm.

Figure 2 is a similar view but to a larger scale and partly broken away showing a portion of the hydraulic mechanism, the tool being near its left hand or inward position.

Figure 3 is a view similar to a portion of Figure 2 but showing the tool near its right hand or retracted position.

Figures 4, 5 and 6 are sectional views to a larger scale showing the control valve in each of three positions.

Figure 7 is a somewhat diagrammatic section through the upper portion of the machine and to a larger scale substantially on the line 7—7 of Figure 1.

Figure 8 is a section similar to a portion of Figure 2 but illustrating a modified construction.

Referring to the drawings, at 1 is indicated a tool-carrying arm shown as fixed to a cylindrical bar 2. This bar is journaled at opposite end portions in bearings 3 and 4 through which the bar is axially slidable as well as rockable. As shown best in Figures 2 and 3, the bearings may comprise cylindrical casings 5 having externally tapering bearing sleeves 6 therein in which the bar 2 is journaled for axial movement. The arm 1 may be fixed to the bar 2 in any suitable manner as by means of the set screws 10. As shown best in Figure 7 this tool bar may support a motor 15 which is connected through a suitable belt 16 passing about an idler 17 to a pulley 18 on a shaft 20. This shaft may be supported in a sleeve 21 and carries on its outer end a rotary tool such as a grinding wheel 22. As shown the casing of the motor 15 is pivoted as at 25 to the upper portion of the arm 1 and an adjusting screw 26 engaging the motor casing and carried by the arm 1 serves to adjust the angular position of the motor to properly tension the belt 16. At 30 is shown a work spindle to which may be fixed by any suitable holding means work such as shown at 31 on which the grinding wheel is to operate. The arm 1 is shown as provided with an extension 35 (see Figure 7), the forward end of which passes beneath a portion of the machine frame 36 and carries a bar or other suitable follower element 37 engaging with a shoe 38 carried on the inner end of a feed bar 39 which is adjustable axially by a suitable feed mechanism shown generally at 40 and which may be of any suitable type such as is well known in the art. The arm 1, together with the parts carried thereby has its weight so disposed as to press the follower bar 37 against the control shoe 38 during the entire axial movement of the tool 22 and by adjustment of the bar 39 the angular position of the arm 1 and thus the feeding relation between the tool and the work it determined. By moving this bar 39 it will be evident that the tool can be fed toward or retracted from the work as may be desired, the bar 2 being journaled eccentric to the work axis. This arrangement of the parts is all old and well known in the art.

The bar 2, however, in accordance with the present invention forms a portion of the hydraulic mechanism by which a reciprocatory motion of the arm 1 for traversing the tool with reference to the work may be produced. To this end in the construction shown in Figures 1 to 3 inclusive, opposite end portions of the bar are tubular, one of these end portions being shown at 40 in Figures 2 and 3. Within each tubular portion is a plunger such as 41 with which a portion of the length of the tubular portion has fluid tight engagement, the tubular portion being shown of slightly reduced internal diameter at its outer end for this purpose as shown at 42. Each tubular portion of the bar 2, together with its plunger, forms a chamber in which fluid under pressure may be introduced to move the bar axially in one direction fluid being exhausted from the other chamber at the same time. To this end the plunger 41 is shown as provided with a pipe 44 forming an intake and exhaust passage for the fluid. Inwardly of the end of the plunger this pipe is shown as provided with an upwardly extended elbow portion 45 which opens into the upper portion of the chamber. By opening the passage at this part of the chamber the trapping of air in the chamber is effectually prevented.

The outer end of the plunger 42 is shown as provided with a closure cap 46 which acts as a coupling between the pipe 44 and a pipe 50 which leads to a valve 51. The opposite end chamber is connected in a similar manner to the pipe 52.

In order to avoid the entrance of foreign matter between the relatively moving portions of the traversing mechanism telescopically arranged sleeves 55 and 56 enclosing the bar 2 may extend between the bearing 3 and the adjacent face of the arm 1 and similar telescopic sleeves 57, 58 and 59 may be arranged between the bearing 4 and the opposite face of the arm 1. Three such telescopic sleeves are shown as arranged between the bearing 4 and this arm in view of the fact that in order to retract the tool from the work it is necessary in the construction shown that the arm 1 be permitted a movement nearer to the bearing 4 than to the bearing 3. Likewise the outer end portions of the bar 2 are protected by cover members 60 which extend from the bearings 3 and 4 to the closure plugs 46 and provide enclosures for the ends of the bar 2.

The valve 51, as shown in Figures 4 to 6, is a somewhat modified four way valve, the modification comprising a third passage 65 in addition to the usual passages 66 and 67 for valves of this type. At some convenient point such as in the base of the machine there is provided a tank 70 for oil or other suitable fluid which may be delivered and exhausted from the pressure chambers to impart the desired traversing motions to the tool. From the tank 70 a pipe 71 leads to a pump 72, this pump delivering through a pipe 73 to the valve 51. An exhaust pipe 74 leads from the exhaust of the valve 51 back to the tank 70, a throttle valve 75 being interposed in this exhaust pipe. When the valve 51 is in the position shown in Figure 4 and in full lines in Figure 7 the supply pipe 73 is in communication with the pipe 52 so that fluid under pressure is delivered to the right hand pressure chamber at the right hand end of the bar 2 as viewed in Figure 1. At the same time the pipe 50 leading from the left hand pressure chamber is opened through the port 66 of the valve to the exhaust pipe 74. Thus the bar 2 is moved to the left to bring the tool into the work as shown in Figure 2, the fluid in the left hand pressure chamber exhausting through the valve 75 by which the exhaust is throttled thus to determine the speed of motion of the bar 2. By placing the handle 80 of the valve 51 in the inclined position shown in Figure 6, the pipes 50 and 52 are blanked and the pump delivers through the passage 65 of the valve directly to the exhaust 74. In this position of the valve the fluid under pressure in both pressure chambers is held confined and the bar is held locked in any position in which it happens to be when the valve handle is moved into this position.

When the handle 80 is moved further downwardly into the horizontal position as shown in Figure 5, the fluid under pressure is delivered from the pump through the pipe 50 to the left hand pressure chamber and the fluid from the right hand pressure chamber is exhausted through the pipe 52 and the valve 51 through the throttle valve 75 so that the bar is given a motion to the right in a direction to withdraw the tool 22 from the work. Instead of forming the rocking and axially movable bar with a pair of single acting hydraulic cylinders, a single double acting cylinder may be substituted, as shown, for example, in Figure 8. Referring to this figure, the rocking and axially movable bar is shown at 90, journaled for rocking and axial movement in a sleeve 91 in the bearing 92. The end of the bar 90 is formed tubular as at 93 and its outer end is shown as closed off by a threaded plug 94. Through this plug slidably passes a plunger 95, the plug 94 being provided with a stuffing box 96 for this purpose, this plunger having at its inner end a piston 97 having a portion 98 making a fluid tight fit with the inside of the portion 93. This piston thus defines opposite sides of a double acting cylinder, these opposite sides communicating through upwardly directed ports 100 and 101 with coaxially arranged passages 102 and 103 through the plunger. The passage 103 communicates with a fluid intake and exhaust pipe 104 and the passage 102 communicates with a similar pipe 105. The pipe 105 leads into a head 106 which is held stationary by means of a casing 107, which encloses the outer end of the bar 90. The pipes 104 and 105 lead to the control valve, in place of the pipes 50 and 52 shown in Figure 1, whereby fluid under pressure can be delivered to the cylinder on either side of the piston 97 while fluid is simultaneously exhausted from the other side of this piston.

Thus it will be seen that of the two motions permitted the bar, one of these, the traversing motion, is produced by hydraulic or fluid pressure mechanism, a portion of which comprises the bar itself. While the tool is shown as carried by the arm, it is evident that the work and tool could be interchanged if desired, the work being carried by the arm and the tool by the stationary frame.

Having thus described an embodiment of this invention it should be evident to those skilled in the art that various changes and modifications might be made therein without departing from the spirit or scope of this invention as defined by the appended claims.

I claim:

1. In combination, a bar, bearings for supporting said bar for rocking and axial movement, an arm fixed to said bar, said bar having tubular end portions, stationary plungers extending into said tubular portions and fitting fluid tight therein to form chambers therewith, said plungers having fluid passages therethrough leading into said chambers, means for selectively delivering or exhausting fluid under pressure through said passages into or out of said chambers to thereby move said bar and arm axially of said bar in either direction and means for supporting a tool and work in cooperative relation, one of said means being carried by said arm.

2. In combination, a bar, bearings for supporting said bar for rocking and axial movement, an arm fixed to said bar, said bar having tubular end portions, stationary plungers extending into said tubular portions and fitting fluid tight therein to form chambers therewith, said plungers having fluid passages therethrough leading into said chambers, means for selectively delivering or exhausting fluid under pressure through said passages into or out of said chambers to thereby move said bar and arm axially of said bar in either direction, said passages opening into the upper portions of said chambers and means for supporting a tool and work in cooperative relation, one of said means being carried by said arm.

3. In combination, a bar, bearings for supporting said bar for rocking and axial movement, an arm fixed to said bar, said bar having tubular end portions, stationary plungers extending into said tubular portions and fitting fluid tight therein to form chambers therewith, said plungers having fluid passages therethrough leading into said chambers, means for selectively delivering or exhausting fluid under pressure through said passages into or out of said chambers to thereby move said bar and arm axially of said bar in either direction, telescopically arranged sleeves surrounding said bar and extending between said bearings and said arm and means for supporting a tool and work in cooperative relation, one of said means being carried by said arm.

4. In combination, a bar, bearings for supporting said bar for rocking and axial movement, an arm fixed to said bar, said bar having tubular end portions, stationary plungers extending into said tubular portions and fitting fluid tight therein to form chambers therewith, said plungers having fluid passages therethrough leading into said chambers, means for selectively delivering or exhausting fluid under pressure through said passages into or out of said chambers to thereby move said bar and arm axially of said bar in either direction, telescopically arranged sleeves surrounding said bar and extending between said bearings and said arm, guards enclosing the outer ends of said bars between said bearings and said plungers and means for supporting a tool and work in cooperative relation, one of said means being carried by said arm.

5. In combination, a pair of spaced bearings, a rockable and axially movable bar carried by said bearings, an arm fixed to said bar between said bearings, means defining with opposite end portions of said bar a pair of opposed pressure chambers, means for selectively admitting or exhausting fluid under pressure to or from said chambers to move said bar axially and means for supporting a tool and work in cooperative relation, one of said means being carried by said arm.

6. In combination, a bar, means for supporting said bar for axial and rocking movement, an arm fixed to said bar, a grinding wheel rotatably carried by said arm, means for holding work to be operated on by said wheel, means for rocking said arm about the axis of said bar to produce feed and grinding motions of the grinding wheel relative to the work, and hydraulic mechanism including a pressure cylinder and piston of which said bar forms a part for reciprocating said bar to produce traversing motions between said wheel and the work.

WILLIAM L. BRYANT.